Sept. 8, 1964   W. A. SEEGERS   3,147,551
HANDPIECE FOR DENTAL DRILLS OR THE LIKE
Filed Oct. 4, 1960   3 Sheets-Sheet 1

United States Patent Office 3,147,551
Patented Sept. 8, 1964

3,147,551
HANDPIECE FOR DENTAL DRILLS OR THE LIKE
Wilhelm A. Seegers, Rohrbach (Saar), Germany, assignor to Siemens-Reiniger-Werke Aktiengesellschaft, Erlangen, Germany, a firm
Filed Oct. 4, 1960, Ser. No. 60,481
Claims priority, application Germany Oct. 9, 1959
7 Claims. (Cl. 32—27)

This invention relates to handpieces for tools, and more specifically to a handpiece for dental drills and other rotating tools, in which a compressed air turbine, rotating at 100,000 and more revolutions per minute, is fitted in an angle head as drive for a tool.

In the known handpieces of this type, the turbine is mounted in ball bearings arranged on both sides of the turbine so as to reduce friction as far as possible. These ball bearings, however, have only a relatively short life owing to their small dimensions and the severe stressing to which they are subjected at the high speeds of rotation. They require special, most careful servicing particularly with respect to cooling and lubrication. For this purpose the propelling air freed from dust and water has been mixed with an oil vapor and at least partly led off through the ball bearings, as the air flowing in the direction of the drill serves at the same time for cooling the drill and the operative field, residues of oil also reach the operative field. This necessitates the use of only the best oil which does not affect the respiration of the patient. In addition to the measures necessary for saving and maintaining the ball bearings as far as possible, the ball bearings are subject to the further objection that a whistling sound is produced by the high frequency and is very disturbing to many patients.

The invention is based on the knowledge that the above-mentioned objections can be overcome by providing a pneumatic bearing for the turbine.

Sliding bearings with axial bearing gaps which are supplied with compressed air through radial gaps are known for motor drives of other types than those used in compressed air turbine drives, for example through the work of Dr. Ing. N. Brunzel "Druckluftgeschmierte Gleitlager (Querlager)" reproduced in "VDI-Berichte," vol. 20 (1957), pages 123 et seq.

The invention consists on the one hand in the use of such compressed air sliding bearings for the radial bearings of the shaft of a turbine wheel on both sides thereof, and on the other hand the invention consists in the provision for taking up the axial drilling pressure on both end faces of the turbine wheel, by the employment of radial bearing gaps through which compressed air may pass into the axial bearing gaps. The result of this is that a pressure is exerted on each of the end faces of the turbine wheel in opposite axial directions. The two counter acting axial pressures firmly hold the turbine wheel in central position in the turbine chamber both when running idle and also when drilling pressure exists. Owing to the fact that in the subject matter of the invention both the radial and also the axial bearing is effected exclusively by means of compressed air, the turbine runs practically free from friction. The bearings therefore have a long life, and the provision of oil lubrication is no longer necessary. The whistling sound caused by the rotating bearing balls is likewise prevented.

Another feature of the invention consists in that the air for driving the turbine is also used for the axial bearings. This is attained by the fact that the turbine wheel has rows of blades arranged symmetrically in relation to its central plane and the shape of the blades and the direction of the feed of the driving air are so chosen that both a torque and also an axial pressure, directed from both sides towards the central plane, are exerted on the wheel. This additional axial compressed air bearing causes a taking up of relatively heavy axial drilling pressures, such as can occur at times in dental laboratory work.

According to yet another feature of the invention at least a portion of the compressed air in the axial bearing gaps is used at the same time as driving air for the turbine, in that the two shaft ends of the turbine are provided with screw-like helical grooves for leading off the bearing air to the blades and the base of the blade is extended in depth by a small recess in the shaft.

A preferred embodiment of the invention will now be described by way of example and with reference to the accompanying schematic drawings, in which FIG. 1 is a side elevation of an angular handpiece for dental purposes;

FIG. 5 is a side elevation of the turbine with its bearing parts after the removal of the housing of the angle head.

Figure 1:
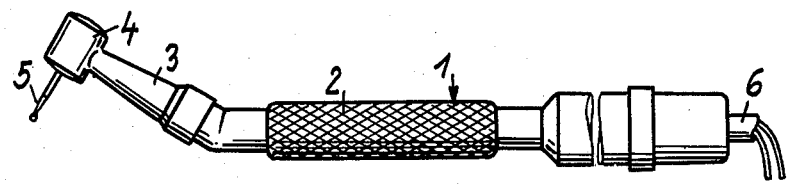

FIG. 1 shows a handpiece 1 for dental drilling machines which consists of a handle part 2, a bent stem 3 with an angle head 4 and a drill 5, as well as the hose connection 6 containing water under pressure and compressed air conduits.

Figure 2:
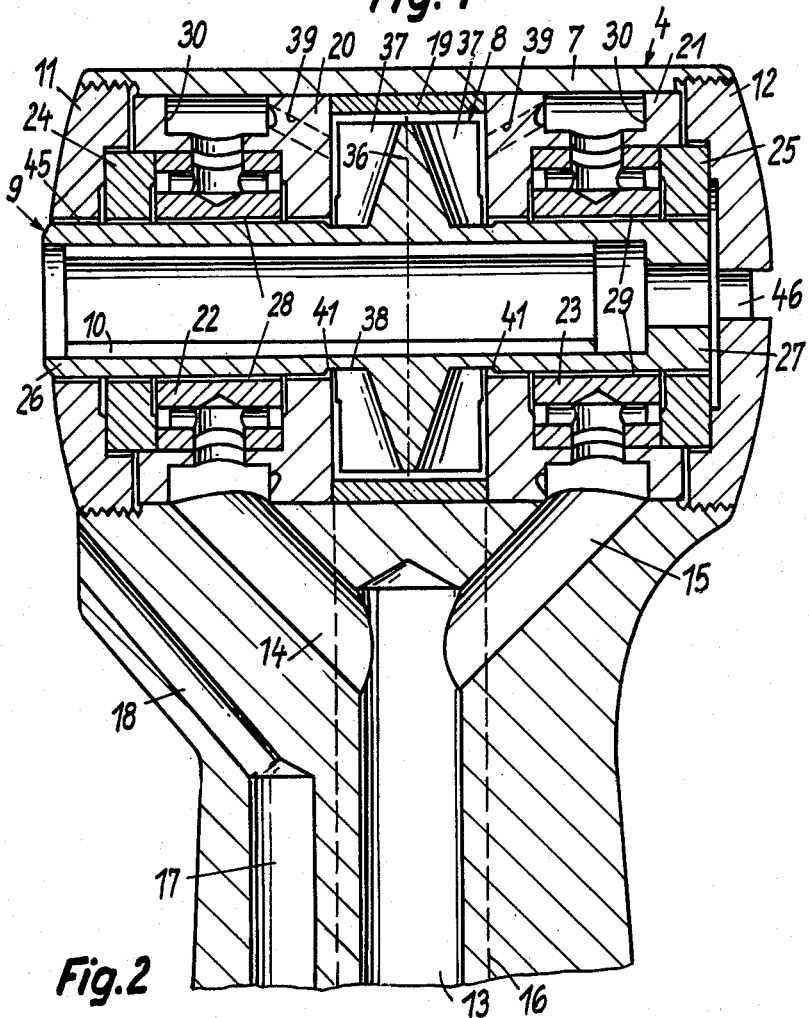
FIG. 2 is an axial longitudinal section, on a larger scale, through an angle head.

The angle head 4 has a cylindrical housing 7 which contains, as shown in FIG. 2, a driving turbine for the drill with its turbine wheel 8 and a turbine shaft 9, in the longitudinal bore of which shaft 9 a clamping sleeve 10 is fitted as tool holder. The cylindrical housing 7 is closed at its front and rear ends by screw covers 11 and 12, respectively.

Compressed air is introduced into the angle head 4 through a conduit 13 which shortly before entering the angle head 4 divides into two conduits 14 and 15 for the air bearings of the turbine. The greater part of the expanded working air is led off through a conduit 16. For feeding the water under pressure to the drill 5 and to the operative field, a conduit 17 is provided which terminates in a discharge nozzle 18.

The turbine bearing parts fitted in the angle head 4 may be composed of several elements chiefly for technical reasons of production. A ring 19 with accurately plane-parallel end faces is pressed into the cylindrical housing 7. Two nozzle rings 20 and 21 are introduced with press fit in the housing 7 and bear against these end faces. Distribution rings 22 and 23 are constructed to tightly fit in the nozzle rings 20 and 21 and similarly mounted locking rings 24 and 25 bear against the distribution rings 22 and 23. The two screw covers 11 and 12 hold the locking rings, the distribution rings and the nozzle rings in axial direction.

For the radial supporting of the turbine, axial annular bearing gaps 28 and 29 are provided between the bearing parts and the shaft ends 26 and 27. The compressed air is introduced radially into these axially extending gaps 28 and 29 by the conduits 14 and 15. For this purpose the nozzle rings 20 and 21—since the two sides of the bearing are of absolutely identical construction only one side is hereinafter described with reference to FIG. 3— are provided with an annular groove 30 in the bottom surface of which eight radial bores 31 are located about the entire periphery at uniform distances apart, which bores 31 are continued in the distribution ring 22 having an annular groove 32, so that in the case of the radial feed of compressed air to the axial bearing gap, a uniform distribution of the compressed air over the entire annular periphery is always ensured. The compressed air then leaves the bores 31 in axial direction on both sides through further bores 33 which lead into annular grooves 34 whereby the pressure is distributed absolutely uniformly. These annular grooves are in direct annular communication with radial annular, narrow, air feed gaps 35 standing perpendicular to the shaft end 26 and to the axial annular bearing gap 28 and the compressed air passes from the air feed gaps 35 to the axial annular bearing gap 28. To obtain a good supporting effect it is evident that the dimensions of the bearing gaps and the air feed gaps must be in proportion to each other. The cross-section of the feed gaps is preferably smaller than that of the bearing gaps, about in the proportion of 2 to 3.

Furthermore, to provide the axial air suspension of the turbine, radial annular bearing gaps 42 are provided between ring flanges 43 on both sides of the turbine wheel 8 and the nozzle rings 20 and 21. These radial annular bearing gaps 42 are made as narrow as possible and communicate directly with the axial annular bearing gaps 28 and 29. The turbine is therefore located in compressed air both radially and axially. On external axial forces occurring, the turbine wheel tending to yield is held in its central position by the increasing of the counter pressure.

Figure 3:
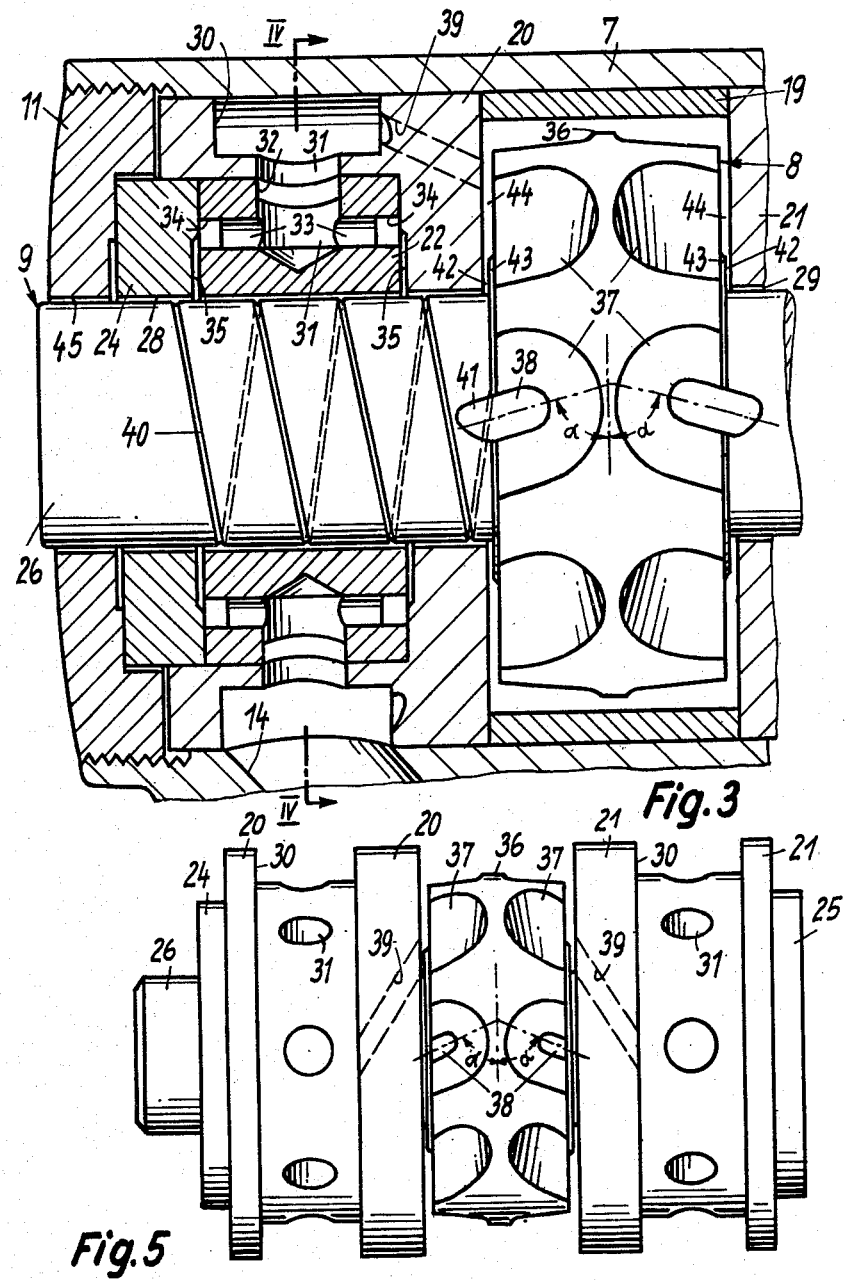
FIG. 3 is a section similar to that shown in FIG. 2 but still further enlarged, broken away and showing the turbine in elevation.
Figure 4:
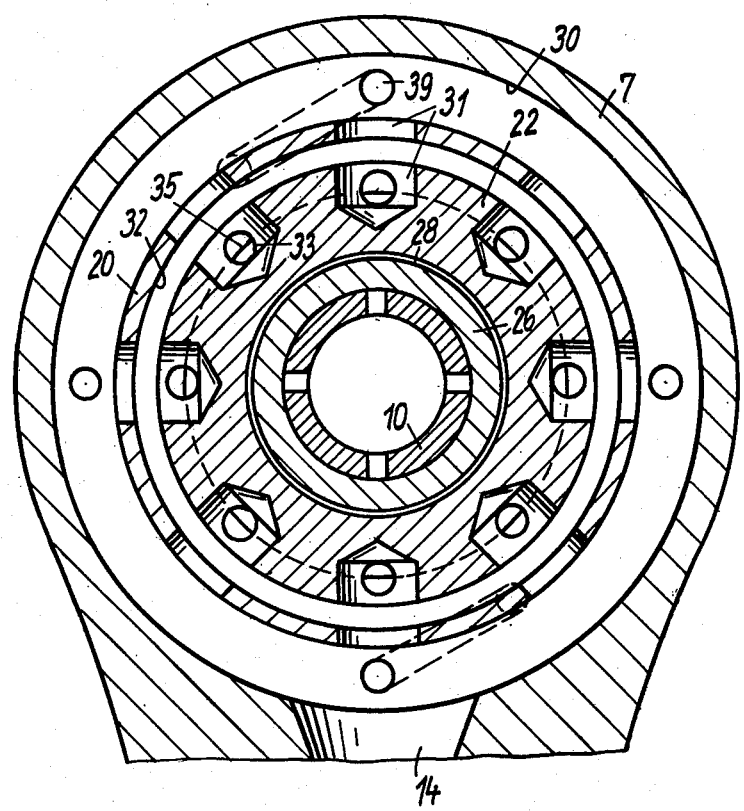
FIG. 4 is a cross-section through the angle head taken on line IV—IV of FIG. 3.

The turbine wheel 8 is formed from a cylindrical workpiece in that two symmetrically arranged rows of blades 37 are milled side by side therein. The two rows are separated from each other by a central rib 36 left standing along the wheel periphery during the milling of the individual blades 37. The blades of each row are inclined and extend at an angle $\alpha$ with respect to the central plane of the turbine wheel 8, as shown in FIGS. 3 and 5. The angle $\alpha$ differs from a right angle and is in both rows equal. The blades can be formed by recesses open to the respective end face of the wheel and with a cross-section increasing from the base of the blade to the periphery of the wheel. The surfaces of the blades have preferably about the shape of a hollow truncated cone with elliptical cross-section, a portion of the trunk being cut off by the end surfaces of the wheel and the smaller end face of the trunk forming the base 38 of the blade. The main axis of the ellipse is inclined at an acute angle with respect to the axis of the turbine so that longitudinal axes of the blades of both rows of blades are at an obtuse angle to each other (FIG. 5).

The feeding of the driving air to the blades is effected tangentially, the direction of flow being inclined with respect to the central plane of the turbine wheel at an angle which differs from a right angle. According to the form of construction illustrated, the driving air is deflected in the annular groove 30 of the nozzle rings 20 and 21. Each of the two annular grooves 30 is connected by four nozzle-like bores 39 with the turbine chamber in such a manner that the compressed air flowing through them strikes the blades 37 at an incline tangential to the bottom of the blades. The construction and arrangement of the nozzle-like bores 39 and the blades 37 are adapted to each other in such a manner that the driving air entering from both sides also contributes to holding the turbine wheel 8 firmly in its central position. Gaps 44 provided on both sides between the outer parts of the turbine wheel and the nozzle rings 20 and 21 are likewise kept very narrow and the compressed air flowing out from the nozzle-like bores 39 strikes, in the case of any axial displacement of the turbine wheel 8, with great force against the portions of the opposite end face of the wheel which have no milled blades. There can be an even number of blades and nozzle-like bores, and the number of blades can also be a multiple of the number of nozzle-like bores. Axial vibrations are avoided by the fact that the blades are acted upon on both sides in the same rhythm and the axial displacements caused by external forces are immediately compensated.

The relieved air in the turbine chamber passes out into the open through the conduit 16 in the handpiece 1 and the hose connection 6.

The compressed air pressed into the axial annular bearing gaps 28 and 29 also contributes to the drive of the turbine. Helical grooves 40 are provided on the ends 26 and 27 of the shaft of the turbine in such a manner that the bearing air can be ejected towards the blades as the turbine rotates. The milling at the base 38 of the blades extends to the shaft at 41 so that there is a small recess for the expansion of the bearing air. From there the air flows against the inclined blades 37 and thus contributes to the drive of the turbine.

The front axial annular bearing gap 28 is also connected with an axial annular gap 45 in the front cover 11 of the angle head 4 so that a portion of the radial bearing air flows to the drill. In order to ensure that the pressure conditions on both sides of the turbine wheel are the same, the same quantity of air must also pass out in some way at the rear end of the angle head 4. For example a bore 46 (FIG. 2) may be provided which is of the same cross-section as the axial annular gap 45. The bore 46 also enables the drill 5 to be pushed out of the turbine head from the rear side thereof.

It may happen that the turbine will run against the bearing surfaces under the action of external forces. Consequently the possible contact surfaces must have good sliding properties. Apart from having an extremely smooth surface, the materials for the turbine shaft and the contact surfaces must be so chosen that these parts slide smoothly on one another. It is advisable, for example, to make one part of Teflon with molycote or some other similar synthetic material and the other part from stainless steel or brass. It is preferable to employ a solid turbine and to cover the contacting surfaces with a material having good sliding properties.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A handpiece for dental drills or other rotating tools, comprising an angle head, a front cover and rear cover closing the head, a compressed air turbine fitted in said angle head for driving a tool at at least 100,000 revolutions per minute and comprising a turbine wheel mounted on a shaft, said shaft mounted in two radial bearings one on each side of the turbine wheel, which bearings are constructed as compressed air bearings having axial annular bearing gaps which extend into radial annular bearing gaps bordering the end faces of the turbine wheel, and radial annular air feed gaps connected to the two axial annular bearing gaps, said turbine wheel having two rows of blades arranged symmetrically to the central plane of the turbine wheel, the blades of each row being inclined at an angle with respect to the central plane of the turbine wheel which differs from a 90° angle, the inclinations of the blades of the two rows being symmetrical with respect to the central plane, the shape of the blades and the direction of feed of the driving compressed air being so selected that a torsional force as well as an axial pressure from both sides toward the central plane is exerted on the turbine wheel, said blades being formed by recesses which open on the respective adjacent end face of the turbine wheel and increase in cross-section from their roots towards the periphery of the wheel.

2. A handpiece as set forth in claim 1, wherein said recesses have the shape of hollow truncated cones, the radially extending working surfaces of the respective blades being complementary in shape to a portion of such a cone.

3. A handpiece for dental drills or other rotating tools, comprising an angle head, a front cover and rear cover closing the head, a compressed air turbine fitted in said angle head for driving a tool at at least 100,000 revolutions per minute and comprising a turbine wheel mounted on a shaft, said shaft mounted in two radial bearings one on each side of the turbine wheel, which bearings are constructed as compressed air bearings having axial annular bearing gaps which extend into radial annular bearing gaps bordering the end faces of the turbine wheel, and radial annular air feed gaps connected to the axial annular bearing gaps, the compressed air fed from a source of compressed air through the handpiece being distributed uniformly to the bearings on both sides of the turbine wheel by means of two feed conduits each of which terminates in an annular groove, in the bottom surface of which groove are provided radial bores distributed uniformly around the periphery from which the radial annular air feed gaps establish connection with the axial annular bearing gaps through the intermediary of further annular grooves connected with the radial bores by axial bores.

4. A handpiece as set forth in claim 3, wherein the two annular grooves at the ends of the feed conduits are connected with the turbine chamber by nozzle-like bores arranged to act on the blades in an inclined tangential direction thereto.

5. A handpiece for dental drills or other rotating tools, comprising an angle head, a front cover and rear cover closing the head, a compressed air turbine fitted in said angle head for driving a tool at at least 100,000 revolutions per minute and comprising a turbine wheel mounted on a shaft, said shaft mounted in two radial bearings one on each side of the turbine wheel, which bearings are constructed as compressed air bearings having axial annular bearing gaps which extend into radial annular bearing gaps bordering the end faces of the turbine wheel, and radial annular air feed gaps connected to the two axial annular bearing gaps, at least a portion of the compressed air located in the axial annular bearing gaps serving at the same time as driving air for the turbine, the turbine shaft having its ends provided with helical grooves for conducting the bearing air to the blades, the base of the blades being deepened by a small recess in the shaft.

6. A handpiece for dental drills or other rotating tools, comprising an angle head, a front cover and rear cover closing the head, a compressed air turbine fitted in said angle head for driving a tool at at least 100,000 revolutions per minute and comprising a turbine wheel mounted on a shaft, said shaft mounted in two radial bearings one on each side of the turbine wheel, which bearings are constructed as compressed air bearings having axial annular bearing gaps which extend into radial annular bearing gaps bordering the end faces of the turbine wheel, and radial annular air feed gaps connected to the axial annular bearing gaps, the front axial annular bearing gap being connected with an annular gap in the front cover of the angle head and the rear axial annular bearing gap having a discharge for the compressed air directed towards the rear.

7. A handpiece as set forth in claim 6, wherein the rear cover of the angle head has a bore the cross-section of which corresponds to the passage aperture of the annular gap in the front cover.

References Cited in the file of this patent

UNITED STATES PATENTS

| 1,225,844 | Mueller | May 15, 1915 |
| 2,671,700 | Seyffert | Mar. 9, 1954 |
| 2,945,299 | Fritz | July 19, 1960 |

FOREIGN PATENTS

| 1,236,409 | France | June 7, 1960 |